US008449958B2

(12) United States Patent
Fulwiler

(10) Patent No.: US 8,449,958 B2
(45) Date of Patent: May 28, 2013

(54) WEB WITH PATTERNED ADHESIVE FOR FORMING LABELS FOR FOAM CUPS

(71) Applicant: WS Packaging Group, Inc., Algoma, WI (US)

(72) Inventor: Daniel R. Fulwiler, Algoma, WI (US)

(73) Assignee: WS Packaging Group, Inc., Green Bay, WI (US)

( * ) Notice: Subject to any disclaimer, the term of this patent is extended or adjusted under 35 U.S.C. 154(b) by 0 days.

(21) Appl. No.: 13/667,689

(22) Filed: Nov. 2, 2012

(65) Prior Publication Data

US 2013/0059133 A1  Mar. 7, 2013

Related U.S. Application Data

(62) Division of application No. 12/174,156, filed on Jul. 16, 2008, now Pat. No. 8,389,080.

(51) Int. Cl.
*B65D 25/00*  (2006.01)

(52) U.S. Cl.
USPC ....... 428/34.7; 428/34.1; 428/34.6; 428/35.7; 220/592.17; 220/62.12; 220/592.1; 156/553

(58) Field of Classification Search
USPC ..... 428/35.7, 34.2, 36.5, 34.1, 34.6; 156/553; 220/592.17, 62.12, 592.1
See application file for complete search history.

(56) References Cited

U.S. PATENT DOCUMENTS 5,952,068 A * 9/1999 Neale et al. ................. 428/36.5

* cited by examiner

*Primary Examiner* — Ellen S Raudenbush
(74) *Attorney, Agent, or Firm* — Brian B. Shaw, Esq.; Thomas B. Ryan; Harter Secrest & Emery LLP

(57) ABSTRACT

A label-wrapped foam cup combines a label in the shape of an annular section with a foam cup having a frusto-conical shape by wrapping the label around a foam cup and securing the label to the foam cup with a patterned adhesive. Text and graphics are printed on a front surface of the labels and a patterned adhesive is printed on a back surface of the labels. The patterned adhesive includes discontinuous deposits of adhesive that bond the label to the foam cup and form corresponding undulations in the front surface of the label. The adhesive pattern can be printed in registry with the text and graphics to provide enhanced visual effects.

14 Claims, 4 Drawing Sheets

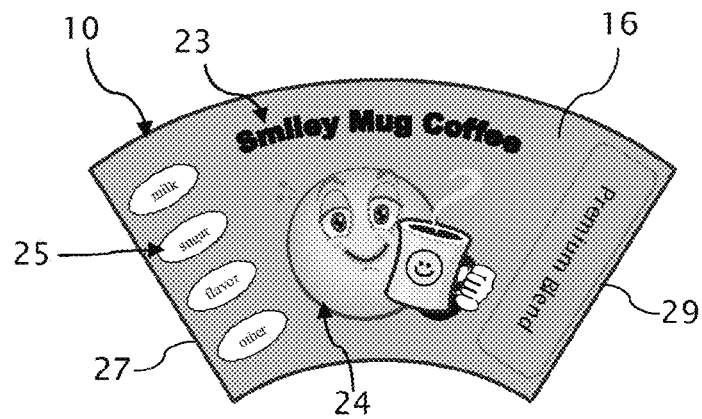
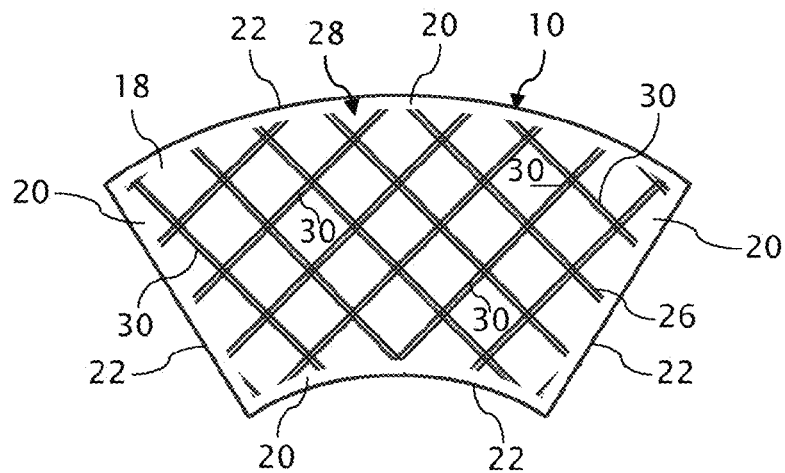
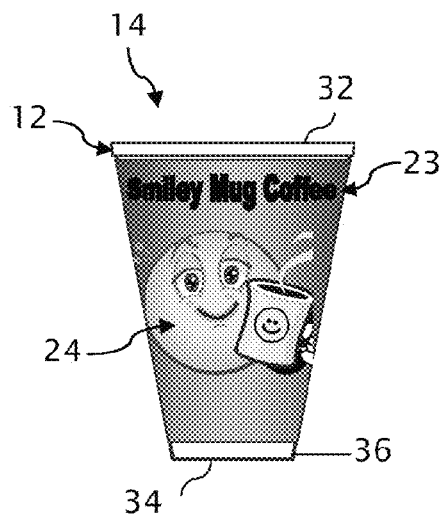
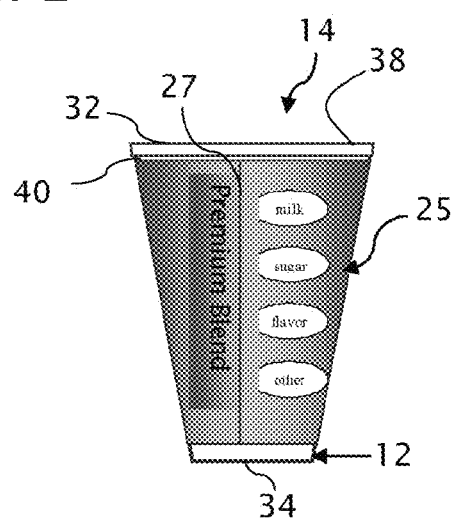

WEB WITH PATTERNED ADHESIVE FOR FORMING LABELS FOR FOAM CUPS

CROSS-REFERENCE TO RELATED APPLICATIONS

This application is a divisional of pending U.S. patent application Ser. No. 12/174,156 filed Jul. 16, 2008, the entire disclosure of which is hereby expressly incorporated by reference.

TECHNICAL FIELD

The invention relates to label-wrapped foam cups and particularly to such cups in which the labels wrap around the cups and contribute to the structural integrity of the cups and to such labels and their manufacture.

BACKGROUND OF THE INVENTION

Foam cups reinforced by wrap-around labels are widely used as drinking cups, particularly for beverages served warm such as coffee. The foam cups, which are typically made of beaded polystyrene, are shaped for holding a liquid and exhibit good insulating properties. The wrap-around labels, which are typically made of paper or plastic film, reinforce sidewalls of the foam cups and provide good printing surfaces for applying text and graphics to the reinforced foam cups.

Sidewalls of the foam cups have a generally frusto-conical shape and the wrap-around labels are shaped to match the unrolled form of the frusto-conical shape. The wrap-around labels are generally attached to the foam cups with a pressure-sensitive adhesive that bonds the labels to the cups. Within a region of overlap, the pressure-sensitive adhesive bonds opposite ends of the wrap-around labels to each other.

Generally, the pressure-sensitive adhesive completely covers a back surface of the label to provide an uninterrupted bond with the underlying foam cup. The continuous bond between the wrap-around label and the foam cup can provide a smooth outer surface for displaying text and graphics. In addition, the smooth outer surfaces of the label-wrapped cups enable the cups to be collected into stacks and released individually from the stacks with a consistently low force. However, heating, cooling, stretching, or bending the sidewalls of the cups can produce unsightly wrinkles in the labels.

Pressure-sensitive label stocks can add cost to the label-wrapped cups because a release liner is required to protect the pressure-sensitive adhesive until the labels are in position for application to the cups. Once the pressure-sensitive labels are removed from the release liner, the release liner is discarded. As much as one-third of the cost of the pressure-sensitive label stocks is attributable to the release liners that form no part of the finished label-wrapped cups.

SUMMARY OF THE INVENTION

The invention among its preferred embodiments reduces the cost of label-wrapped foam cups, enhances bonding between the labels and the foam cups, improves grip, avoids unsightly wrinkles, and contributes to the appearance of the label-wrapped foam cups. Cost can be reduced by obviating the release liner and by patterning adhesive on a back surface of the linerless labels. Bonding can be enhanced by using an externally activated adhesive, such as a heat-activated adhesive, that provides a more permanent bond between the labels and the foam cups and by applying the externally activated adhesive in beads or ridges that melt, flow, or otherwise migrate into pores within the foam cups for providing rigid mechanical locks. Grip can be improved by patterning the externally activated adhesive at a thickness such that the surface of the label is correspondingly textured by underlying beads or ridges of the adhesive. Unsightly wrinkles can be avoided by stronger bonds and by surface undulations in the labels that accommodate limited amounts of expansion and contraction of the underlying foam cups. Contributions to the appearance of the label-wrapped foam cups can be made by coordinating the patterning of the adhesive on a back surface of the labels with printing on a front surface of the labels to produce desired visual effects.

One version of the invention features a label-wrapped foam cup combining a foam cup having an open end and a closed end joined by a peripheral wall including inner and outer wall surfaces with a label wrapped in a frusto-conical form around the outer wall surface of the foam cup. Printed matter is applied to a front surface of the label, and a patterned adhesive is applied between a back surface of the label and the outer wall surface of the foam cup. The patterned adhesive includes discontinuous deposits of adhesive that bond the label to the foam cup and form corresponding undulations in the front surface of the label.

Preferably, the foam cup is made of expanded polystyrene and the adhesive is a heat-activated adhesive. Deposits of adhesive melt into surface interstices between beaded structures of the foam cup. The deposits of adhesive can have a thickness prior to melting that is greater than an average depth of the surface interstices for both forming strong mechanical bonds and texturing the surface of the label.

The label can be divided into different annular sections along the height of the foam cup. For example, a continuous adhesive can be deposited within a first annular section and a discontinuous adhesive can be deposited within the second annular section. The first annular section can be adjacent to the open or closed end of the foam cup to provide a continuous seal or a smooth surface for stacking the cups, and the second annular section can be located intermediate of the cup ends to provide the desired texturing. The patterned adhesive can be deposited as a plurality of parallel or crisscrossed lines or as an array of beads. The form, density, or thickness of the adhesive deposits can be varied progressively between the opposite ends of the cup or discontinuously to produce more localized variations. For example, the printing and patterning of the adhesive can be registered to produce such effects as raised lettering or angularly sensitive images.

Another version of the invention features a web for forming a succession of labels for wrapping in a frusto-conical form around foam cups. A continuous web has inner and outer surfaces. Graphics can be printed on the outer surface of the web defining a succession of labels having a fixed length in a direction for wrapping around the cups. An externally activated adhesive can be printed on the inner surface of the web in registration with the graphics printed on the outer surface of the web in a succession of adhesive lengths less than the fixed length of the labels.

BRIEF DESCRIPTION OF THE DRAWING FIGURES

FIG. 1 is a front view of a label in a form for wrapping around a foam cup.

FIG. 2 is a back view of the label showing an externally activated adhesive applied in a crisscross pattern.

FIG. 3 is a front view of a label-wrapped foam cup, which is wrapped with the label of FIGS. 1 and 2.

FIG. 4 is a back view of the label-wrapped foam cup of FIG. 3.

DETAILED DESCRIPTION OF THE INVENTION

Figure 5:
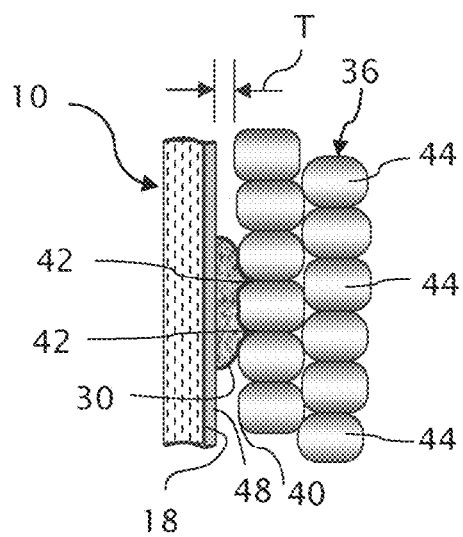
FIG. 5 is an expanded side view of a bond formed between a portion of the label and a portion of the foam cup showing a bead of a heat-activated adhesive melted into surfaces interstices between expanded foam beads of the foam cup.

A label 10 is shown in FIGS. 1 and 2 in a flat state with an overall shape intended for efficiently wrapping around a foam cup 12 as shown in FIGS. 3 and 4 for forming a label-wrapped foam cup 14. A front surface 16 of the label 10, as shown in FIGS. 1, 3, and 4, contains various text and graphics including a trade name 23, a graphic illustration 24, and a set of descriptors 25 for describing the intended contents of the label-wrapped foam cup 14.

The foam cup 12 is preferably made in a conventional manner from plastic materials, such as foamed or expanded polystyrene. Typically, pre-expanded polystyrene beads are filled into a mold of suitable shape and heated with steam to further expand and fuse the foam beads into an integrated cup structure. The foam cup 12, which has an overall frusto-conical shape, includes an open end 32 and a closed end 34 joined by a peripheral wall 36 having conically tapered inner and outer wall surfaces 38 and 40. The labels 10 are wrapped around and bonded to the outer wall surface 40 using a patterned externally activated adhesive 26 as shown in FIG. 2. In addition, one end 27 of the labels 10 preferably overlaps another end 29 of the labels 10 so that the labels 10 also bond to themselves to complete a closed frusto-conical shape. However, the label ends 27 and 29 could also be arranged to abut one another.

A back surface 18 of the label 10 is shown in FIG. 2 with the externally activated adhesive 26 applied in a crisscross pattern 28 of elongated beads (or ridges) 30 over much of the back surface 18. A margin 20 between a boundary of the adhesive pattern 28 and a periphery 22 of the label 10 is free of the adhesive 26 so that when the label 10 is applied to the foam cup 12, the adhesive 26 does not leak beyond the periphery 22 of the label 10. The margin 20 also provides for cleanly die cutting individual labels 10 from a web 92 (shown in FIGS. 11, 12, and 13). Preferably, the margin 20 has an average width of at least one-half millimeters but less than 2 millimeters.

The externally activated adhesive 26 is preferably a low-temperature heat-activated adhesive that transitions from a solid state to a tacky state at less than the temperature at which the foam cup 14 breaks down from heat. For example, the heat-activated adhesive, also referred to as a hot-melt adhesive, turns tacky at an elevated temperature such as approximately 200 degrees Fahrenheit or less and preferably at a temperature of between 170 degrees Fahrenheit to 180 degrees Fahrenheit. The foam comprising the peripheral wall 36 provides insulation to inhibit transfers of heat from hot liquids within the foam cup 12 to the adhesive pattern 28, which largely precludes any significant re-melting or undue softening of the heat-activated adhesive. However, even if some softening of the heat-activated adhesive does occur, the result is expected to be merely an increase in tackiness similar to the ordinary state of a pressure-sensitive adhesive.

The greatly enlarged breakaway sectional side view of FIG. 5 shows one of the beads 30 of the heat-activated adhesive forming a bond between the back surface 18 of the label 10 and the outer wall surface 40 of the foam cup's peripheral wall 36. The bead 30 is shown melted into interstices 42 in the outer wall surface 40 formed between fused polystyrene beads 44. When hardened upon cooling, the bead 30 forms a mechanical interlock in addition to the customary chemical bonding of the heat-activated adhesive for forming a strong bond with the peripheral wall surface 40. Similar physical and chemical bonding occurs between the bead 30 and the back surface 18 of the label 10, which is preferably made of paper or film. In addition, a barrier layer 48 can be applied between the back surface 18 of the label 10 and the pattern of adhesive 28 including the beads 30 to enhance the bonding of the adhesive to the back surface 18 and to inhibit ingress of discolorants or other visual or structural impairments into the labels 10. The barrier layer can be a varnish or other protective agent.

Figure 6:
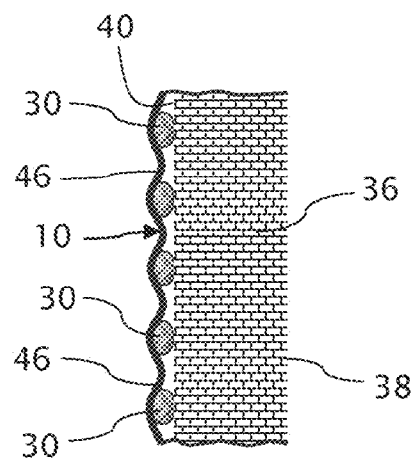
FIG. 6 is a less expanded side view of a plurality of bonds between a portion of the label and a portion of the foam cup showing undulations of the label between beads of the heat-activated adhesive.
Figure 7:
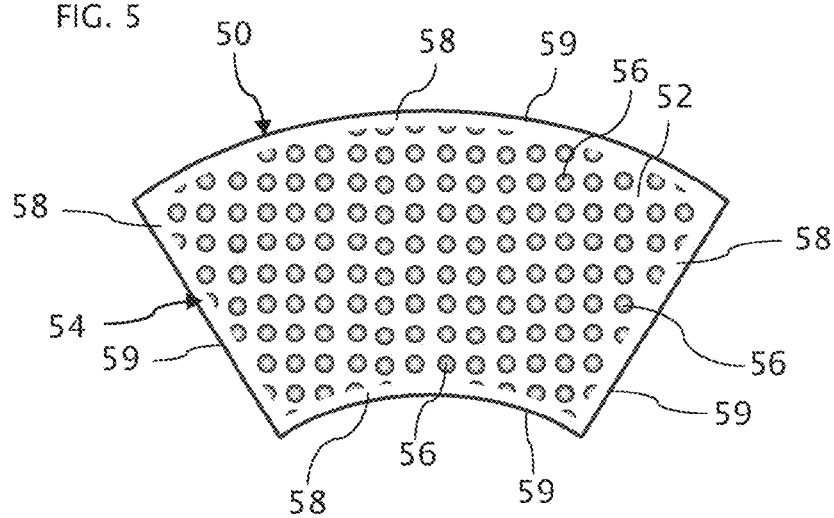
FIG. 7 is a back view of a similar label showing a heat-activated adhesive applied as an array of hemispheric-shaped beads.

As also shown in FIG. 5 and similarly apparent in the less enlarged view of FIG. 6, the beads 30 have a thickness "T" well beyond an average depth of the interstices 42 for spacing the label 10 from the outer wall surface 40 and for supporting local undulations 46 in the label 10 that provide a textured look and feel to the label-wrapped cup 14. The undulations 46 accommodate relative expansions and contractions of the label 10 and the foam cup 12 by varying amplitudes of the undulations and thereby avoiding permanent wrinkling or creasing of the labels 10. The bonds formed by the beads 30 of the heat-activated adhesive remain unbroken by allowing the unbonded portions of the label 10 to vary in spacing with respect to the outer wall surface 40 to compensate for externally induced variations in the periodicity of the beads 30. For example, mechanically or thermally induced variations in the size of the foam cup 12 relative to the label 10 can be dispersed by the beads 30 over the columnar supported areas of the label 10 to avoid local concentrations of stress between the label 10 and the foam cup 12 that might otherwise result in a wrinkling or creasing of the label 10. The undulations 46 also provide improved grip so that the label-wrapped foam cups 14 are less likely to be unintentionally dropped or spilled. The thickness "T" of the beads 30 also creates air spaces between the label 10 and the foam cup 12, which further improves the insulating properties of the label-wrapped foam cup 14.

FIGS. 7-10 depict different patterns with which the externally activated adhesive 26 can be deposited onto the back surfaces 52, 62, 72, and 82 of similar labels 50, 60, 70, and 80. For example, a heat-activated adhesive applied to the back surface 52 of label 50 has the form of a regular array pattern 54 of hemispheric beads 56. A margin 58 separates the array pattern 54 from a periphery 59 of the label 50 so that upon melting, the beads 56 do not extend beyond the periphery 59 of the label 50 and so that upon die cutting individual labels 20 from a web 92 (shown in FIGS. 11, 12, and 13), the cutters remain free of adhesive. Although shown as regularly spaced hemispheric beads 56 of similar size and shape, the adhesive elements of the array pattern 54 could be formed by one or more other shapes including ovals, crosses, or line segments and can vary in both size and distribution throughout the array pattern 54.

Figure 8:
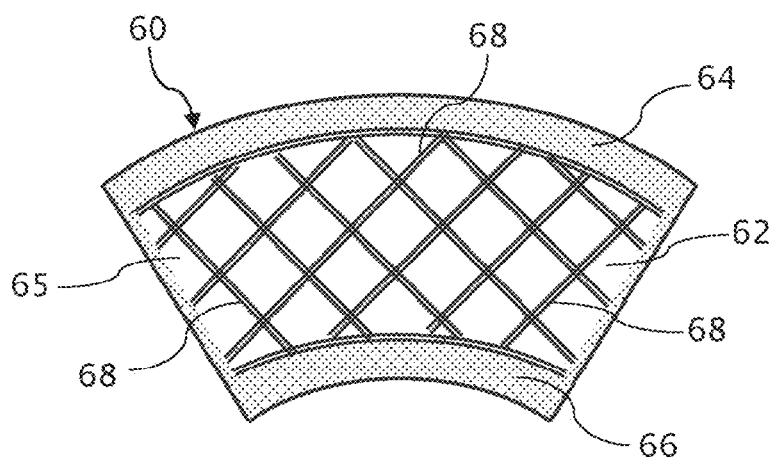
FIG. 8 is a back view of a similar label in which the heat-activated adhesive is applied in two annular zones containing a continuous adhesive straddling an intermediate annular zone containing a discontinuous adhesive pattern.

The externally activated adhesive 26 is applied to the back surface 62 of the label 60 shown in FIG. 8 in three distinct annular zones 64, 65, and 66. Within the annular zones 64 and 66 near the top and bottom of the label 60, a heat-activated adhesive is applied as a continuous deposit of adhesive covering all or nearly all of the annular zones 64 and 66 without interruption. However, within the annular zone 65, which is straddled by the annular zones 64 and 66, a heat-activated adhesive is applied as a discontinuous deposit of adhesive in the form of elongated beads 68 similar to the crisscross pattern 28 of the label 10. The annular zones 64 and 66 containing patches of continuous adhesive provide for sealing the corresponding top and bottom portions of the label 10 to the outer wall surface 40 of the foam cup's peripheral wall 36. In addition, the corresponding portions of the front surface 16 of the label 10 remain smooth for purposes of stacking similar label-wrapped cups 14 together and for separating individual cups 14 from the stack. The adhesive patterns within the annular zones 64, 65, and 66 can also differ from one another in other ways such as by incorporating different combinations of continuous and discontinuous adhesive patterns or different types of discontinuous adhesive patterns. The sizes and number of annular zones can be varied, and the zones can subdivide the label 10 in other ways, such as zones that contain different adhesive patterns in different circumferential positions around the label-wrapped cup 14.

Figure 9:
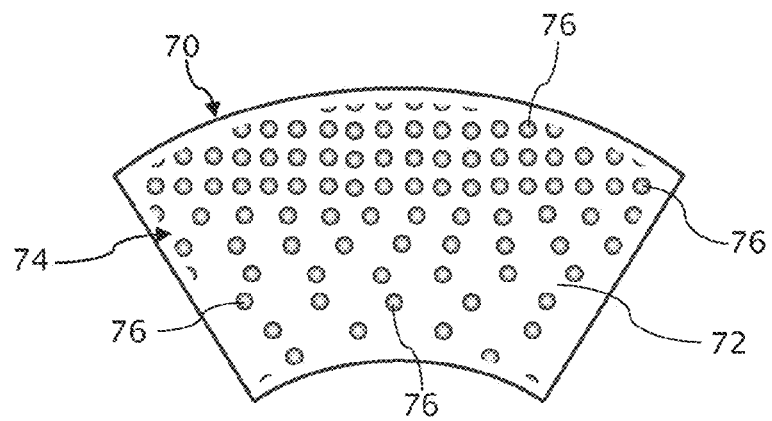
FIG. 9 is a back view of a similar label with the heat-activated adhesive applied in a pattern that progressively varies in density from a top to a bottom of the label.

The back surface 72 of the label 70, as shown in FIG. 9, includes a discontinuous deposit of the heat-activated adhesive in the form of a distribution 74 of hemispheric beads 76 that varies in density between a top and bottom of the label 70. While the distribution 74, as shown, progressively increases in density towards the top of the label 70 other orientations and kinds of variation can also be used. For example, the variation in the density of the hemispheric beads 76 can increase toward the middle of the label 70 and progressively decrease towards both the top and the bottom of the label 70.

Figure 10:
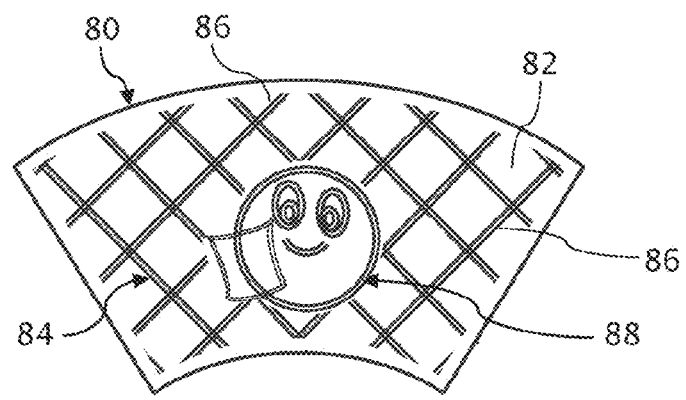
FIG. 10 is a back view of a similar label in which a heat-activated adhesive is applied in a pattern that is registered with graphics printed on a front of the label.

In addition to or as an alternative to avoiding wrinkles and improving the grip and insulating properties of the label-wrapped cups, such as the label-wrapped cup 14, deposits of the externally activated adhesive (e.g., a heat-activated adhesive) can be registered with some or all of the printing on the front surface of the labels to augment the printing or to produce other visual effects. For example, the back surface 82 of the label 80, as shown in FIG. 10, includes in addition to a regular crisscross pattern 84 of adhesive beads 86, a graphic pattern 88 intended to match or otherwise complement a graphic pattern such as the graphic illustration 24 appearing on the front surface 16 of the label 10. The graphic pattern 88 of adhesive renders the graphic illustration 24 more pronounced when viewed on the cup 14 and can also contribute to an apparent three-dimensional image. Other visual effects are also possible from registering the adhesive patterns with corresponding patterns of print, such as an angularly sensitive visual effect by registering the printing on the front surface of the label 80 with the expected undulation patterns of the labels 80 based on the spacing of the adhesive beads 86.

Figure 11:
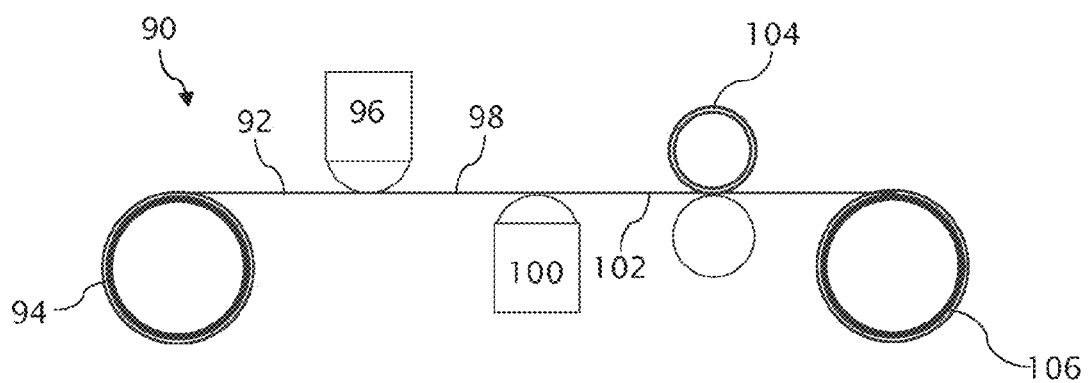
FIG. 11 is a diagram of an in-line press for forming a succession of labels according to any of the earlier figures along a web.
Figure 12:
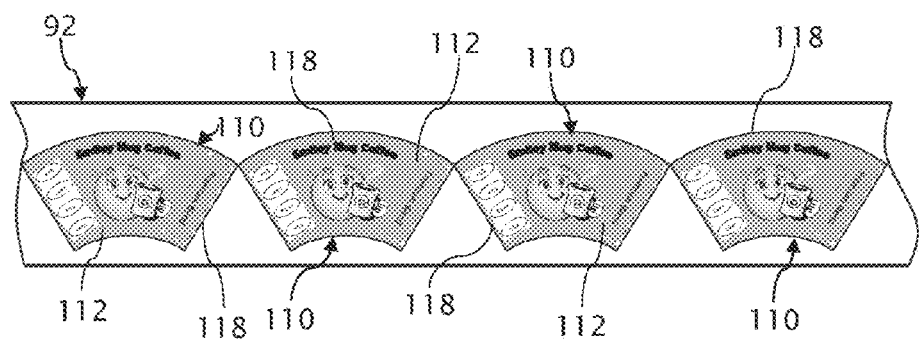
FIG. 12 is a truncated view of an outer surface of the web showing front surfaces of a succession of similar labels along the web.
Figure 13:
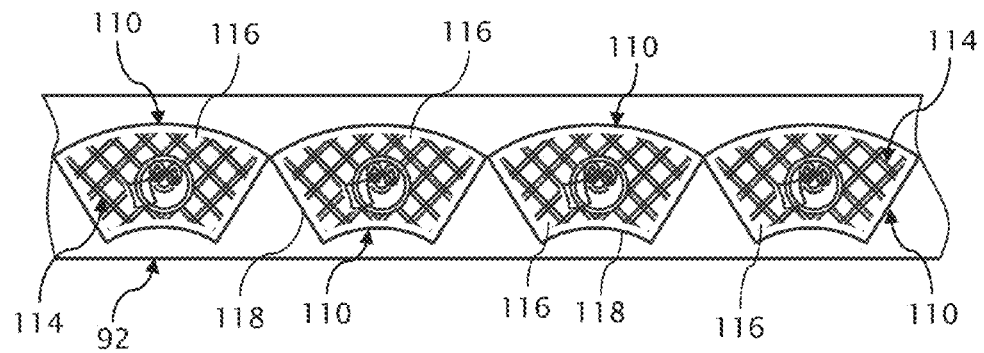
FIG. 13 is a similarly truncated view of an inner surface of the web showing back surfaces of the succession of similar labels along the web.

An in-line press 90, as shown in FIG. 11, is arranged for producing a succession of fixed length and width wrap-around labels 110 along a web 92 also shown in FIGS. 12 and 13. Following an unwinder 94, one or more printing stations 96 apply multiple color graphics and text to an outer surface 98 of the web 92 in successive positions corresponding to front surfaces 112 of the labels 110. The printing stations 96 can be repetitive or variable printing stations including such repetitive printing processes as flexography, letterpress, lithography, rotogravure, and screen-printing, and such variable printing processes as inkjet, thermal transfer, and laser printing.

One or more adhesive patterning stations 100 apply an externally activated adhesive, such as a heat-activated adhesive, in a repeating pattern 114 to an inner surface 102 of the web 92 corresponding to a succession of back surfaces 116 of the labels 110. Similar repetitive format printers can be used for applying the adhesive patterns 114. Preferably, a fixed length and a fixed width of the adhesive pattern 114 is less than the fixed length and width of the labels 110 to leave a surrounding margin that recesses the adhesive pattern 114 from peripheries 118 of the labels 110. Although not shown, an additional applicator station could be used to apply a barrier layer to the inner surface 102 of the web 92 between the back surfaces 116 of the labels 110 and the adhesive patterns 114 to prevent the ingress of discolorants or other visual or structural impairments into the labels 110. Alternatively, the inner surface 102 of the web 92 could be pretreated with a similar barrier layer.

The adhesive patterning stations 100 are registered with the printing stations 96 in a conventional manner by relating the printing and adhesive stations 96 and 100 to each other or to the common web 92. One or more die cutting stations 104 provide for trimming the web 92 to a desired width and for partly forming the peripheries 118 of the labels 110, such as by cutting out the top and bottom profiles of the labels 110. A rewinder 106 rewinds the in-line processed web 92 for delivery to a label applicator machine for applying the labels 110 to a succession of foam cups 12. Such applicators are known in the art, such as disclosed in U.S. Pat. No. 4,332,635 to Holbrook et al., which patent is hereby incorporated by reference in all relevant and consistent respects.

Preferably, the externally activated adhesive is a heat-activated adhesive, but other forms of externally activated adhesive could also be used having limited tackiness prior to activation for obviating the need for a release liner. For example, the adhesive patterns can be formed from solvent-activated adhesives, moisture-activated adhesives, or light-activated adhesives.

The invention claimed is:

1. A web for forming a succession of labels for wrapping in a frusto-conical form around foam cups comprising
a continuous web having inner and outer surfaces,
graphics printed on the outer surface of the web defining a succession of labels having a fixed length in a direction for wrapping around the cups, and
a heat-activated adhesive printed on the inner surface of the web in registration with the graphics printed on the outer surface of the web in a succession of adhesive lengths less than the fixed length of the labels.

2. The web of claim 1 in which the heat-activated adhesive is applied within boundaries so that when the labels are die-cut from the web, the heat-activated adhesive is recessed from peripheries of the labels.

3. The web of claim 2 in which each of the labels includes a margin between the boundaries of the heat-activated adhesive and the peripheries of the labels having an average width of at least one-half millimeter.

4. The web of claim 3 in which the margin has an average width less than two millimeters.

5. The web of claim 1 in which the heat-activated adhesive is printed on the inner surface of the web in a pattern of discontinuous deposits of adhesive.

6. The web of claim 5 in which the discontinuous deposits of adhesive are printed as a plurality of lines.

7. The web of claim 6 in which the plurality of lines of adhesive form a crisscross pattern.

8. The web of claim 5 in which the discontinuous deposits of adhesive are printed as a plurality of beads.

9. The web of claim 8 in which the plurality of beads of adhesive are distributed in an array pattern.

10. The web of claim 1 in which the labels have a width, and the discontinuous deposits vary in a direction along the width of the labels.

11. The web of claim 10 in which the discontinuous deposits vary in density along the width of the labels.

12. The web of claim 10 in which individual deposits of the adhesive vary in volume along the width of the labels.

13. The web of claim 1 further comprising a barrier layer on the inner surface of the web.

14. The web of claim 13 in which the barrier layer is located between the inner surface of the web and the heat-activated adhesive.

* * * * *